(12) United States Patent
Thacker et al.

(10) Patent No.: US 8,945,496 B2
(45) Date of Patent: Feb. 3, 2015

(54) CARBON CAPTURE SYSTEMS AND METHODS WITH SELECTIVE SULFUR REMOVAL

(75) Inventors: Pradeep S. Thacker, Bellaire, TX (US); Anindra Mazumdar, Houston, TX (US)

(73) Assignee: General Electric Company, Schenectady, NY (US)

( * ) Notice: Subject to any disclaimer, the term of this patent is extended or adjusted under 35 U.S.C. 154(b) by 696 days.

(21) Appl. No.: 12/955,948

(22) Filed: Nov. 30, 2010

(65) Prior Publication Data
US 2012/0131853 A1 May 31, 2012

(51) Int. Cl.
| | | |
|---|---|---|
| B01D 53/48 | (2006.01) | |
| B01D 53/56 | (2006.01) | |
| B01J 8/00 | (2006.01) | |
| C01B 7/00 | (2006.01) | |
| B01D 53/52 | (2006.01) | |

(52) U.S. Cl.
CPC ............ *B01D 53/52* (2013.01); *B01D 2256/22* (2013.01); *B01D 2257/304* (2013.01); *B01D 2257/306* (2013.01); *B01D 2257/308* (2013.01); *Y02C 10/14* (2013.01)
USPC .................................................. 423/244.09

(58) Field of Classification Search
USPC ......................................................... 423/220
See application file for complete search history.

(56) References Cited

U.S. PATENT DOCUMENTS

| | | | |
|---|---|---|---|
| 3,744,272 A * | 7/1973 | Oldberg ........................... | 62/439 |
| 4,382,912 A * | 5/1983 | Madgavkar et al. .......... | 423/224 |
| 7,481,985 B2 | 1/2009 | Jain et al. | |
| 2003/0181314 A1* | 9/2003 | Kranz .............................. | 502/34 |
| 2004/0247509 A1 | 12/2004 | Newby | |
| 2004/0253159 A1* | 12/2004 | Hakka et al. ................... | 423/228 |
| 2005/0129598 A1* | 6/2005 | Chinn et al. ................... | 423/226 |
| 2006/0149423 A1 | 7/2006 | Barnicki et al. | |
| 2006/0207177 A1 | 9/2006 | Andrus et al. | |
| 2007/0028764 A1 | 2/2007 | Wittrup et al. | |
| 2007/0130832 A1 | 6/2007 | Liu et al. | |

(Continued)

FOREIGN PATENT DOCUMENTS

| | | |
|---|---|---|
| WO | 2008103467 A1 | 8/2008 |
| WO | 2008124767 A2 | 10/2008 |

(Continued)

OTHER PUBLICATIONS

Steeneveldt, R., et al. "CO2 Capture and Storage—Closing the Knowing-Doing Gap". Trans IChemE, Part A, Chemical Engineering Research and Design, 2006, 84(A9), pp. 739-763.

(Continued)

*Primary Examiner* — Roy King
*Assistant Examiner* — Jenny Wu
(74) *Attorney, Agent, or Firm* — GE Global Patent Operation; Peter T. DiMauro

(57) ABSTRACT

Disclosed herein are systems and methods for treating carbon dioxide in an environmentally effective manner. Systems and methods include providing a carbon dioxide enriched stream having $CO_2$ and at least one oxidizable sulfur compound and passing at least some of the carbon dioxide enriched stream to carbon dioxide storage, wherein the method further comprises passing at least some of the carbon dioxide enriched stream to selective sulfur removal during a period of system upset. Selective sulfur removal may comprise treatment with an solid or liquid capable of oxidizing the oxidizable sulfur compound.

10 Claims, 2 Drawing Sheets

(56) References Cited

U.S. PATENT DOCUMENTS

| | | |
|---|---|---|
| 2007/0178035 A1* | 8/2007 | White et al. ............ 423/248 |
| 2007/0186473 A1 | 8/2007 | Wallace |
| 2007/0212286 A1 | 9/2007 | Shah et al. |
| 2008/0011161 A1 | 1/2008 | Finkenrath et al. |
| 2008/0056971 A1 | 3/2008 | Hughes |
| 2008/0107581 A1 | 5/2008 | Sparling et al. |
| 2008/0127632 A1 | 6/2008 | Finkenrath et al. |
| 2009/0095155 A1 | 4/2009 | Frydman et al. |
| 2009/0120285 A1 | 5/2009 | Thacker et al. |
| 2009/0121191 A1 | 5/2009 | Tillman |
| 2009/0173081 A1 | 7/2009 | Wallace et al. |
| 2009/0235822 A1 | 9/2009 | Anand et al. |
| 2009/0293723 A1 | 12/2009 | Steele |
| 2010/0183491 A1 | 7/2010 | Mazumdar et al. |
| 2011/0195008 A1 | 8/2011 | Menzel et al. |

FOREIGN PATENT DOCUMENTS

| | | |
|---|---|---|
| WO | 2008139208 A1 | 11/2008 |
| WO | 2010040495 A2 | 4/2010 |

OTHER PUBLICATIONS

No Author. "Study Evaluates Design of High Capacity CO2 Injection Plants". Oil & Gas Journal, vol. 103, issue #33 (2006). Found on internet at http://www.ogj.com/index/article-display/270870/articles/oil-gas-journal/volume-104/issue-33/processing/study-evaluates-design-of-high-capacity-cosub2-sub-injection-plants.html . Accessed May 3, 2009.

EP Search Report and Opinion dated Mar. 21, 2012 from corresponding EP Application No. 11190194.8.

* cited by examiner

CARBON CAPTURE SYSTEMS AND METHODS WITH SELECTIVE SULFUR REMOVAL

FIELD OF THE INVENTION

The present invention generally relates to systems and methods for the capture of carbon from fluid streams. In particular, some embodiments herein relate to systems and methods for the capture of carbon dioxide from fluid streams with selective sulfur removal from carbon dioxide enriched streams.

BACKGROUND

Many known processes that produce carbon dioxide gas ($CO_2$), including Integrated Gasification Combined-Cycle systems (IGCC), are efficient and effective for producing needed power, chemicals, electricity, and other desirable products for modern society. However, there has been a widespread desire to capture the produced $CO_2$ so that it does not emit this gas into the atmosphere. In recent years, there has been a growing concern related to gas emissions suspected of contributing to global climate change, particularly, $CO_2$. Many jurisdictions are considering requirements for mitigation of $CO_2$ being introduced into the atmosphere. Accordingly, there is a need to recover $CO_2$ for sequestration or deposition as a product.

Many generally known systems for capturing such $CO_2$ which have been under recent research and development include storage (e.g., underground) of the captured gas as a liquid, solid, or hydrate, or reuse for enhanced recovery of natural resources, e.g., enhanced oil recovery (EOR), or similar measures. Premier examples of systems that can provide power while also storing $CO_2$ include many IGCC-CCS (carbon capture and storage) systems.

Some important sources of $CO_2$, such as synthesis gas ("syngas") produced by gasification or partial oxidation of carbonaceous fuels, also generate sulfide gases such as hydrogen sulfide ($H_2S$), COS, or methyl mercaptan ($CH_3SH$). It has already been proposed to recover $CO_2$ from syngas (or syngas previously subjected to the water-gas shift reaction; shifted syngas), compress it, and store or send it to an EOR pipeline. Where $CO_2$ and sulfide gases are co-generated, the sulfur component of the sulfide gases has mainly been recovered as elemental sulfur in a sulfur recovery unit (SRU).

In view of increasing desirability to capture and/or store $CO_2$, it continues to be necessary to improve $CO_2$ recovery systems so to maintain compliance with present and future environmental consideration and regulatory mandates.

BRIEF SUMMARY OF THE INVENTION

One embodiment of the present invention is directed to a method for treating carbon dioxide comprising, providing a carbon dioxide enriched stream including $CO_2$ and at least one oxidizable sulfur compound, and passing at least some of the carbon dioxide enriched stream to carbon dioxide storage. This method further comprises passing at least some of the carbon dioxide enriched stream to selective sulfur removal during a period of system upset.

A further embodiment of the present invention is directed to a carbon dioxide treatment system. The system comprises: a source of a carbon dioxide enriched stream including $CO_2$ and at least one oxidizable sulfur compound; and a compression system fluidly coupled to the source, the compression system configured to compress the carbon dioxide enriched stream for channeling to carbon dioxide storage. The carbon dioxide treatment system further comprises a selective sulfur removal unit fluidly coupled to the source, the selective sulfur removal unit configured to accept at least some of the carbon dioxide enriched stream during a period of system upset.

A yet further embodiment of the present invention is directed to a carbon dioxide treatment system, comprising at least one acid gas removal unit configured to separate syngas into a $CO_2$-enriched stream comprising at least one oxidizable sulfur compound, a compression system configured to compress the $CO_2$ enriched stream for channeling to a carbon dioxide storage system, and at least one selective sulfur removal unit configured to remove at least some oxidizable sulfur compounds from a $CO_2$ enriched stream. This system further comprises at least one system controller coupled to the compression system, the carbon dioxide storage system, and to the at least one selective sulfur removal unit, and at least one vent fluidly coupled to the at least one selective sulfur removal unit. The at least one system controller is configured to output an activation signal to an actuator adapted to facilitate fluid coupling of the at least one selective sulfur removal unit to the at least one acid gas removal unit during a period of upset condition.

Other features and advantages of this invention will be better appreciated from the following detailed description.

BRIEF DESCRIPTION OF THE DRAWINGS

Embodiments of the invention will now be described in greater detail with reference to the accompanying Figures.

DETAILED DESCRIPTION

Figure 1:
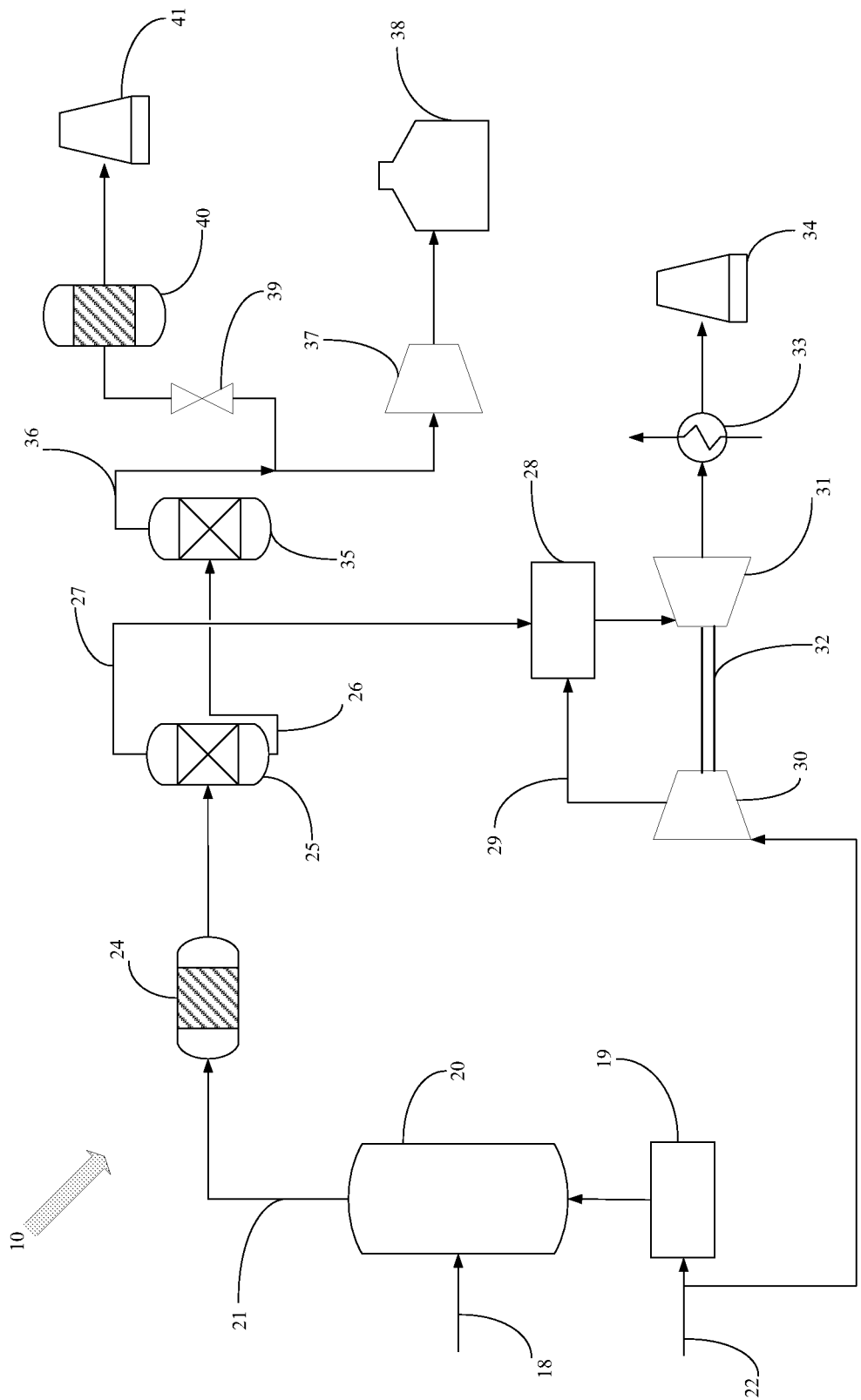
FIG. 1 depicts a schematic process flow for an exemplary IGCC system in accordance with embodiments of the invention.

The present applicants have ascertained that a product $CO_2$ destined for storage or resource recovery may sometimes contain sulfide gases in objectionable quantity, e.g., such a quantity that product $CO_2$ could not be released into the ambient atmosphere due to emissions regulations and/or other requirements. Although systems configured for capture and storage of $CO_2$ have a normal mode of operation such that there is no need to ordinarily ever release any significant component of the $CO_2$ output of the system (such as in many IGCC-CCS systems), the present applicants have further determined that there may be instances in which aberrations to the normal mode can occur, i.e., system upsets or upset conditions. Examples of such upsets include events where the $CO_2$ capture compression system is not online, or any other event in which $CO_2$ cannot be sent to storage/EOR; further examples of such upsets are provided hereinunder. In many such cases, the whole system may have to be shut down, or else risk having an emissions event if venting a product $CO_2$ into atmosphere.

In order to address such cases, embodiments of the present invention provide a standby $CO_2$ vent treatment system which is capable of cleaning a product $CO_2$ stream, thereby reducing its content of sulfide gases, e.g., to environmentally acceptable limits. This treatment system is centered on a selective sulfur removal step, wherein the sulfide gases may be selectively removed from product $CO_2$.

Thus, in a first aspect, embodiments of the present invention include a method for treating carbon dioxide, which comprises providing a carbon dioxide enriched stream comprising $CO_2$ and at least one oxidizable sulfur compound; and passing at least some of the carbon dioxide enriched stream to carbon dioxide storage, wherein the method further comprises passing at least some of the carbon dioxide enriched stream to selective sulfur removal during a period of system upset.

A "carbon dioxide enriched stream" may be generally considered to mean any fluid (e.g., gaseous or liquid) stream which has had its $CO_2$ content increased, frequently but not always by removal of another component of the stream. A typical example of a carbon dioxide enriched stream may be obtained from an acid gas removal unit operating upon a syngas feed stream. Such acid gas removal unit may employ one or more stages to separate an optionally shifted syngas feed stream into a hydrogen enriched stream and a carbon dioxide enriched stream, among other possible streams. Another example of a carbon dioxide enriched stream may be that which is obtained from a membrane separation system receiving syngas. Such membrane may permeate carbon dioxide, thereby producing a $CO_2$ enriched stream as the permeate; or it may reject carbon dioxide and permeate a different component of syngas, in which case the retentate is a carbon dioxide enriched stream. Yet another example of a carbon dioxide enriched stream may be that which is obtained by regeneration of a solid sorbent for carbon dioxide, e.g., a stream recovered from a microporous solid sorbent loaded with carbon dioxide that is released by pressure letdown and/or temperature increase.

Membrane systems may comprise any membrane material that is stable at the operating conditions and has the required $CO_2$ permeability and selectivity at the operating conditions. Possible membrane materials that are selective for $CO_2$ include certain inorganic and polymer materials, as well as combinations comprising at least one of these materials. Polymeric materials known to be selective for $CO_2$ include, for example, certain polymer materials, such as polyethylene oxides, polyimides, and polyamides. Other membranes may include polyethylenimine/poly(vinyl alcohol). In practice, the membrane may often comprise a separation layer that is disposed upon a support layer. The porous support may comprise a material that is different from the separation layer.

As noted above, a carbon dioxide enriched stream may be obtained from an acid gas removal unit receiving a syngas feed stream. As used herein, the term "acid gas removal unit" or AGRU is intended to refer to any unit or system which facilitates removal of at least a portion of the gaseous $CO_2$ and gaseous hydrogen sulfide ($H_2S$) contained in a syngas-containing stream. In some embodiments, either a $H_2S$-lean $CO_2$ stream (sometimes referred to as a sweet CO2 stream) or a $H_2S$-rich CO2 stream (sometimes referred to as a sour CO2 stream) is produced within an AGRU. The production of $H_2S$-lean $CO_2$ and $H_2S$-rich $CO_2$ streams depends upon factors that include, but are not limited to, temperatures and pressures within AGRU, fluid flow rates, and the solvent selected. In some embodiments, an AGRU comprises two stages, each employing, e.g. a physical solvent, one stage to selectively remove hydrogen sulfide and another stage to selectively remove carbon dioxide.

Solvents that may have capability of removing carbon dioxide and/or hydrogen sulfide from syngas include solvents which function by physical absorption. Examples of suitable physical absorbent solvents are methanol and other alkanols, propylene carbonate and other alkyl carbonates, dimethyl ethers of polyethylene glycol of two to twelve glycol units and mixtures thereof (commonly known under the trade name of Selexol™), N-methyl-pyrrolidone, and sulfolane. Physical and chemical absorption methods may be used in concert as exemplified by the Sulfinol™ process using sulfolane and an alkanolamine as the absorbent, or the Amisol™ process using a mixture of monoethanolamine and methanol as the absorbent, or Rectisol™.

Other solvents which may be employed in a solvent-based AGRU include solvents which function by chemical absorption, e.g., amine-based solvents. Such an AGRU may comprise an amine absorber and a regeneration tower. An amine absorber may be based on alkanolamine solvents that have the ability to absorb $CO_2$, usually at relatively low temperatures, and are easily regenerated by raising the temperature of the rich solvents. The solvents used in this technique may include, for example, triethanolamine, monoethanolamine, diethanolamine, diisopropanolamine, diglycolamine, methyldiethanolamine, and the like. These may be used neat, in combination with each other or with water, or in combination with physical solvents.

The carbon dioxide enriched stream recovered from a solvent-based acid gas removal unit may be further treated prior to subsequent storage. The carbon dioxide enriched stream may be introduced into a knock-out drum to separate at least some of any entrained solvent, and the stream may be further contacted with mass-transfer contact elements to further remove entrained solvent.

A carbon dioxide enriched stream may, in certain embodiments, comprise at least about 50 mol % $CO_2$, relative to total number of moles of species in the stream. In some embodiments, a carbon dioxide enriched stream may comprise at least about 90 mol % $CO_2$ or even at least about 99 mol % $CO_2$. Although not strictly limited to the following, the oxidizable sulfur compound in the carbon dioxide enriched stream will often comprise one or more selected from hydrogen sulfide and carbonyl sulfide. In some embodiments, the carbon dioxide enriched stream to be treated by selective sulfur removal may comprises hydrogen sulfide, and when present, it may be in an amount of up to about 2 mol % $H_2S$ or even higher, e.g., in an amount of from about 0.1 mol % $H_2S$ to about 2 mol % $H_2S$. Many applications may tolerate significant quantities of $H_2S$, and applicants of the present invention has ascertained that EOR may sometimes benefit from quantities of $H_2S$. In other embodiments, the carbon dioxide enriched stream comprises hydrogen sulfide in an amount of less than about 1 mol % $H_2S$, or less than about 0.1 mol % $H_2S$.

An "oxidizable sulfur compound" may generally be considered to refer to a compound of sulfur which is capable of being oxidized into elemental sulfur, or into another compound of sulfur having a higher oxidation state of the sulfur. Some typical examples of oxidizable sulfur compound may include hydrogen sulfide ($H_2S$) or carbonyl sulfur (COS). Other examples of oxidizable sulfur compound may include one or more mercaptan (such as methyl mercaptan $CH_3SH$) or ethyl mercaptan ($CH_3CH_2SH$)), or dialkyl sulfide or dialkyl disulfide. These compound are generally objectionable when emitted, at least by virtue of their odor. However, for purposes of this disclosure, an oxidizable sulfur compound does not include sulfur dioxide or sulfur trioxide in its definition.

In accordance with embodiments of this disclosure, "carbon dioxide storage" may generally refer to numerous effective means for avoiding the emission of carbon dioxide into the atmosphere. To avoid emissions, carbon dioxide may be stored or it may be utilized in a chemical processing plant, e.g., for use in making urea. Some carbon dioxide storage schemes utilize $CO_2$ for resource recovery (e.g., recovery of oil and/or natural gas) as well as for long-term storage. For example, enhanced oil recovery (EOR) and enhanced coal bed methane recovery (ECBM) are two large scale applications which use and store $CO_2$. Generally, EOR refers to techniques for improving oil recovery from a producing field through injection of $CO_2$, e.g., through miscible displacement. ECBM generally increases the recovery of methane from coal seams, wherein $CO_2$ is introduced into coal seams to displace methane. Other examples of carbon dioxide storage include long-term storage in depleted or uneconomical well or mine, or in a saline aquifer, or under the ocean floor (subsea), or undersea at a suitable location or cave. Carbon dioxide storage may also comprise storage of $CO_2$ in a device, e.g., solvent storage tank.

In accordance with embodiments of this invention, a "period of system upset" refers to any time period (or portion thereof) during which a system for treating carbon dioxide (or portion thereof) is not functioning in a normal state. Some examples of system upset, as that term is utilized in the present disclosure, may include conditions where a sink for carbon dioxide has insufficient capacity to accept $CO_2$ from a carbon dioxide treatment system. For example, a carbon dioxide treatment system (under normal conditions) may be configured to deliver carbon dioxide to a pipeline, which pipeline then channels the delivered carbon dioxide stream to one or more end points. The end points are points of use (e.g., EOR), and/or points of storage (e.g., underground sequestration). In this situation, the pipeline is considered to be the "sink" for carbon dioxide. However, if an end point of the pipeline reaches its capacity (e.g., the underground sequestration is full or not functioning normally), or an end point is shut down temporarily (e.g., the EOR system is down for maintenance), then (at least temporarily) the sink will have insufficient capacity or demand for accepting the normal output of a carbon dioxide treatment system; i.e., the sink for carbon dioxide has insufficient capacity to accept $CO_2$. Then the system may be considered to be having a period of system upset.

A more particular example of a carbon dioxide treatment system is an IGCC system with carbon capture for storage (IGCC-CCS). Many IGCC-CCS systems may be configured to capture about 50% or more of their generated carbon dioxide, under normal conditions. A sink for this generated carbon dioxide may be a pipeline coupled to the compression system, configured to accept substantially all of this captured carbon dioxide under normal conditions. When this sink cannot accept the normal amount of this captured carbon dioxide, then the system may be considered to be having a period of system upset.

Another example of "system upset" may include conditions where a carbon dioxide treatment system (e.g., IGCC-CCS system) both captures and stores at least some of its $CO_2$ on-site, rather than delivery off-site. In such circumstances, a carbon dioxide sink may take the form of a solvent tank (i.e., a tank containing a solvent which is capable of dissolving carbon dioxide) or other on-site storage system. If there is a time period during which on-site $CO_2$ storage has insufficient capacity for accepting carbon dioxide relative to its normal capacity, then this carbon dioxide treatment system may be considered to be having a period of system upset.

Some other examples of system upset may include conditions where a compression system within a $CO_2$ treatment system has insufficient capacity to compress the $CO_2$ generated by the $CO_2$ treatment system. Consider, for example, a carbon dioxide treatment system (e.g., IGCC-CCS system) which includes a compression system. Under normal functioning circumstances, this compression system compresses carbon dioxide for delivery as a fluid to a carbon dioxide sink. However, if the compression system is shut down for maintenance, or is malfunctioning, or is starting or stopping, it may be considered to have insufficient capacity and thus be having a period of system upset.

Finally, some other examples of "system upset" may include conditions where an acid gas removal unit within a carbon dioxide treatment system is malfunctioning or has other insufficiency. Other examples of system upset may include conditions of plant start up (e.g., while operations are lining out the $CO_2$ to carbon capture and sequestration systems), or plant shut-down (e.g., while a gasifier is being depressurized).

As used herein, the term "during a period of system upset" does not necessarily mean that a carbon dioxide enriched stream must always be passed to selective sulfur removal during the entirety of the time that a system is in upset condition. It may refer to any one or more lesser period of time, provided that the upset condition exists. For example, there may be embodiments where a pulsed venting of cleaned $CO_2$ occurs.

As used herein, "selective sulfur removal" generally refers to a processing step in which at least a portion of the oxidizable sulfur compound content of a carbon dioxide enriched stream is selectively removed, relative to carbon dioxide. In many embodiments, selective sulfur removal refers to systems which substantially do not absorb or remove $CO_2$ from fluids (e.g., gaseous fluids) but which can remove oxidizable sulfur compounds from such fluids. In some embodiments, the selective sulfur removal comprises a selective chemical sulfur removal, e.g., by an oxidative liquid or an oxidative solid or other reagent chemically reactive with an oxidizable sulfur compound. In other embodiments, selective sulfur removal may comprise a selective physical sulfur removal, e.g., by a solvent or a sorbent having ability of preferentially removal of an oxidizable sulfur compound relative to carbon dioxide in a fluid stream. Some physically active solid sorbents may comprise one or more of metal oxides, zeolites and microporous carbon.

In certain embodiments of the present disclosure, selective chemical sulfur removal may comprise removal of oxidizable sulfur compound via an oxidation reaction and/or via another chemical reaction. Certain selective chemical sulfur removal processes may employ an oxidative liquid having an ability to oxidize an oxidizable sulfur compound. Such oxidative liquid may comprise a redox active organic compound (e.g., anthraquinone disulfonic acid or other quinone), or may comprise a solution (e.g., an aqueous solution) of a compound of one or more metal selected from iron, copper, manganese, vanadium, and cobalt; or the like. In some embodiments, the oxidative liquid may comprise a chelate complex of one or more of the above-named metals. Some exemplary chelate complex solutions suitable for the purpose may include aqueous solutions of chelated ferric ion, such as that which is employed in the so-called Lo-Cat™ Process or the Sulferox™ Process, each of which utilize solutions of chelated iron. When selective chemical sulfur removal comprises contact with an oxidative liquid, promotion of such contact may be facilitated by any one of a number of gas-liquid contacting units.

Certain selective chemical sulfur removal processes may employ an oxidative solid having an ability to oxidize an oxidizable sulfur compound, e.g., an oxidative solid comprising at least one metal oxide, where such metal may be selected from the group consisting of iron, cobalt, copper, manganese, vanadium, and combinations thereof; and the like. For example, copper oxide has the capability of catalyzing the oxidation of hydrogen sulfide into sulfur or sulfur dioxide under oxidative conditions.

Certain selective chemical sulfur removal processes in accordance with embodiments of the invention may employ a solid having an ability to chemically react (e.g., by a displacement reaction) with an oxidizable sulfur compound. For example, many systems in which solid ZnO or iron oxide (e.g., the so-called dry box system or the Sulfatreat™ system) is used to remove hydrogen sulfide from a gas stream, are suitable for use in embodiments of the present invention. Other suitable solids may also comprise, for example, zinc titanate, zinc ferrite, tin oxide, copper oxide, cerium oxide, or mixtures thereof. These solid-based selective chemical sulfur removal systems typically employ fixed-bed or fluidized bed or moving beds of solids.

It should be understood that the ability of a liquid or solid to oxidize an oxidizable sulfur compound is not necessarily mutually exclusive of ability of that same liquid or solid to otherwise chemically react with the an oxidizable sulfur compound. For example, cupric oxide is capable of catalyzing the oxidation of hydrogen sulfide under specific conditions as discussed above, but can also react with hydrogen sulfide to form cupric sulfide under other specified conditions.

Many of the above selective sulfur removal systems are regenerable by thermal and/or chemical means, whereby they may regain a lost ability to selectively remove oxidative sulfur compounds. Thermal means may include high temperatures effective to remove sulfur or sulfur compounds from spent selective sulfur removal units. Chemical means may include contacting a flow of an oxygen-containing gas with a spent selective chemical sulfur removal unit, whereby elemental sulfur is often liberated. For selective sulfur removal processes employing an oxidative liquid, regenerative processes typically involve regeneration in a separate oxidizing process vessel.

In accordance with embodiments of the disclosure, the method treating carbon dioxide may include passing at least about 50 vol % (sometimes at least 90 vol %) of the carbon dioxide enriched stream to selective sulfur removal during the period of system upset. Often, substantially all of the output of a system which provides a carbon dioxide enriched stream may have to be passed to selective sulfur removal during the period of system upset, to comply with emissions regulations.

Conditions of temperature and pressure of the selective sulfur removal are readily selected by the person of ordinary skill in the field, using no more than ordinary engineering knowledge to optimize conditions for effective sulfur removal. Depending on choice of type of selective sulfur removal (e.g., chemically oxidizing solids, or solutions of oxidizing metal chelate complexes, etc.), different conditions may be selected. The carbon dioxide enriched stream may be suitably heated or cooled, and pressurized or depressurized, depending on the conditions required for the chosen mode of selective sulfur removal.

Regardless of the choice of selective sulfur removal, the method may further comprise recovering a cleaned $CO_2$-rich stream from the selective sulfur removal during a period of system upset, and the cleaned $CO_2$-rich stream is subsequently vented to the atmosphere. Alternatively, or in conjunction with venting, this cleaned $CO_2$-rich stream may also be channeled to a turbine; recycled to a gasifier; and/or admixed with a combustible material and then flared.

In accordance with embodiments of the present invention, the method for treating carbon dioxide may include a normal mode of operation which further comprises compressing the carbon dioxide enriched stream to form a compressed carbon dioxide enriched stream, followed by passing at least some of the compressed carbon dioxide enriched stream to carbon dioxide storage (as defined above). In some embodiments, carbon dioxide must be supplied at elevated pressures for effective sequestration, deposition, or delivery to a pipeline, or for recycling to a gasifier. In such instances, $CO_2$ removed from an integrated system may require a final compression step, e.g., before delivery to a pipeline or to storage.

For transmission through a pipeline or for other usage or for storage, this recovered $CO_2$ may need to be transformed into a liquid or other dense state, usually at high pressures (typically on the order of 2000 psia). Thus, the gaseous $CO_2$ is pressurized with one or more $CO_2$ compressors. For example, the compression strategy may include a sequence of serial compressors, optionally with pumping as a last stage. Alternatively, a compression strategy may include multiple serial compressors combined with pumping and a refrigeration cycle, as would be understood by one skilled in the art. Such compressor train may have one or more interstage cooling steps and/or water removal steps. The actual pressure requirement for sequestration of $CO_2$, however, is determined by the characteristics of the storage site as well as by the process of transportation of the $CO_2$ (e.g., pipeline) and the process for injection into the storage site.

In some embodiments, the compressed carbon dioxide enriched stream will have a pressure of about 10 MPa to about 70 MPa, or more particularly, from about 15 MPa to about 60 MPa. Many applications, e.g., EOR, may require such high pressures. In some embodiments, the compressed carbon dioxide enriched stream is brought to a temperature of about 15° C. to about 50° C. after compression. In still other embodiments, the compressed carbon dioxide enriched stream is in a supercritical state.

Alternatively, embodiments of the present invention may comprise a method for treating carbon dioxide having a normal mode of operation which does not include a final compression of the carbon dioxide enriched stream. For example, $CO_2$ may be absorbed from a syngas in a suitable solvent at an elevated pressure and low temperature to form a $CO_2$-rich solvent, with the rich solvent subjected to a subsequent temperature increase to flash $CO_2$ from the solvent at elevated pressure.

A more specific embodiment of the invention relates to a method for treating carbon dioxide recovered as part of an IGCC-CCS system. In broad outline, such method typically comprises gasifying carbonaceous material in a gasifier under partial oxidation conditions to provide a raw syngas including CO, $H_2$, and oxidizable sulfur components, followed by subjecting at least some of the syngas to water gas shift conditions to provide a shifted syngas comprising at least $CO_2$ and $H_2S$. Thereafter, the method may further comprise selectively separating $H_2S$ from at least some of the shifted syngas to provide an $H_2S$-depleted stream, and then selectively separating $CO_2$ from the $H_2S$-depleted stream in a solvent to form a $CO_2$-rich solvent and hydrogen enriched stream. Many other sequences for removal of $CO_2$ and $H_2S$ from shifted syngas are per se known, as would be understood by the person of ordinary skill in the field. Thus, an IGCC-CCS system should not be construed as being limited to these described AGRU steps.

A $CO_2$ enriched stream including an oxidizable sulfur compound may be separated from the $CO_2$-rich solvent, followed by compressing at least some of the $CO_2$ enriched stream to form a compressed $CO_2$ stream. At least some of the compressed $CO_2$ stream may be channeled to carbon dioxide storage. In accordance with embodiments of the invention, the method further comprises passing at least some of the $CO_2$ enriched stream (usually prior to its compression but after its separation from a $CO_2$-rich solvent) to a selective sulfur removal unit during a period of system upset. The stream that is recovered from selective sulfur removal is a generally emittable $CO_2$ rich stream which may be vented to atmosphere during a period of system upset. In some embodiments, at least some of the shifted syngas may be contacted with a solvent to selectively separate $H_2S$, and wherein separated $H_2S$ is further converted to sulfur in a sulfur recovery unit (SRU). At least some of the hydrogen enriched stream may be combusted in a turbine to provide power.

The carbonaceous material fed to the gasifier in accordance with embodiments is not particularly limited. The carbonaceous material may comprises at least one member selected from low rank coal, bituminous coal, anthracite coal, liquid hydrocarbonaceous fuel, coke, oil shale, tar sands, asphalt, pitch, biomass-based material, and mixtures thereof; and the like. It may be especially advantageous to employ low rank coals. Coals having a "low rank" are generally understood by persons skilled in the art to typically be those coals having a lower grade than bituminous, e.g., sub-bituminous or lignitic coal. In some case, such low rank coals may have a relatively high oxygen content, such as from about 16% to 25% by weight. Other characteristics of low rank coals may include a relatively high moisture content, such as in the range of about 10% to 40%, and a relatively high dry ash content, such as in the range of about 12% to 40%. Low rank coals are present in abundance in the mid-continent region of the United States (as Powder River Basin coal), and in China (as brown coal).

It may be convenient to employ a slurried coal gasification reactor in an IGCC-CCS system. A typical slurried coal gasification reactor operates by partial oxidation of coal delivered as a slurry and gasified in the presence of oxygen. Generally, such gasification reactor is coupled in flow communication with an air separation unit (ASU) and receives the $O_2$ channeled from the ASU via an $O_2$ conduit. A typical gasifier system may include at least one ASU that is coupled in flow communication with an air source. Such air sources may include, but are, not limited to, dedicated air compressors and/or compressed air storage units. ASU separates air into oxygen ($O_2$), nitrogen ($N_2$), and other components may be released via a vent. Generally, an ASU may supply oxygen to a gasifier and compressed nitrogen to a gas turbine for NOx emission control and power augmentation. Such a gasification reactor is also in flow communication with a coal grinding and slurrying unit, which in turn is in flow communication with a coal source and a water source. A coal slurrying unit is configured to mix the coal and water to form a coal slurry reactant stream that is channeled to the gasification reactor via a coal slurry conduit.

Especially in embodiments where the carbonaceous feedstock includes coal and/or heavy oil, as well as in other instances, a gasification reactor may also produce a hot slag stream as a by-product of the syngas production. To handle this stream, such slag stream is channeled to a slag handling unit via a hot slag conduit. A slag handling unit quenches and breaks up the slag into small slag pieces wherein a slag removal stream is produced.

To cool the hot syngas produced by the gasifier, the gasifier may be coupled in flow communication with a radiant syngas cooler via a hot syngas conduit. Such radiant syngas cooler receives the hot, raw syngas stream to transfers at least a portion of the heat to a heat recovery steam generator (HRSG) via a conduit. Subsequently, such radiant syngas cooler produces a cooled raw syngas stream that may be channeled to a convective syngas cooler for further cooling of the raw syngas stream.

A cooled raw syngas stream may then be channeled to a syngas scrubber and low temperature gas cooling (LTGC) unit, to remove particulate matter entrained within the raw syngas stream, and provide additional cooling to the raw syngas stream. The LTGC may also convert at least a portion of any COS in the raw syngas stream to $H_2S$ and $CO_2$ via hydrolysis.

This disclosure should not be construed as being limited to treatment of carbon dioxide derived only from IGCC-based syngas. Other possible systems include those which utilize steam methane reforming (SMR), autothermal reforming (ATR) and/or catalytic partial oxidation (CPO) to convert a feed to a syngas or reformate comprising hydrogen and carbon monoxide. Although such feed often comprises natural gas, such plants may be configured to use any suitable gas or liquid as fuel, such as for example, bio-gas (comprising mainly methane), liquefied petroleum gas (LPG), naphtha, butane, propane, diesel, kerosene, ethanol, methanol, aviation fuel, a coal derived fuel, a bio-fuel, an oxygenated hydrocarbon feedstock, and mixtures thereof.

FIG. 1 depicts a schematic process flow for an exemplary IGCC system 10 incorporating a selective sulfur removal unit 40. It is not intended to comprehensively show all features of such an IGCC system, but the person of ordinary skill in the art would appreciate that various additions, deletions, and modifications may be made while remaining within the scope of this high-level view of such system. Thus, a carbonaceous fuel may be delivered to gasifier 20 via feed line 18. Gasifier 20 is blown with enriched oxygen gas recovered from an air separation unit (ASU) 19, under effective conditions to form a raw syngas recovered from gasifier 20 through line 21. This raw syngas, comprising CO, $CO_2$, $H_2S$, and $H_2$ and other components, is generally provided to water-gas shift reaction unit 24 to convert at least some of the CO to $CO_2$ and $H_2$ via suitable reaction with water within unit 24. Shifted syngas from unit 24 is fed to absorber 25 of an acid gas removal unit (AGRU) for absorption of the acid gas content ($CO_2$, $H_2S$) of the shifted syngas by a solvent. A hydrogen-rich sweet gas stream is recovered overhead of absorber 25 in line 27 and fed to combustor 28. Combustion within 28 is supported with compressed air provided by line 29 that is an output of air compressor 30, operating on air from 22. Hot exhaust gas from combustor 28 drives turbine 31, which may be used to provide electrical power, and 31 is in rotary communication with air compressor 30 via rotor 32. Exhaust from 31, largely water vapor, is then cooled at heat exchanger 33 to raise steam for other purposes, and then vented at stack 34.

Returning now to the AGRU section of FIG. 1, an acid-gas rich solvent is recovered from absorber 25 through line 26, and delivered to $CO_2$ desorption unit 35, from which a carbon dioxide enriched stream may be recovered through line 36 via pressure letdown in 35, temperature increase in 35, or combination thereof. Under a normal mode of operation in the IGCC system 10, the carbon dioxide enriched stream in 36 may be compressed to elevated pressure by compressor/compression train 37 and then sent to CO2 storage, depicted schematically at 38. However, during a period of system upset, a valve 39 in fluid communication with 36 may be opened to shunt some or all of the carbon dioxide enriched stream in 36 to a selective sulfur removal unit 40, and from thence to $CO_2$ vent or stack 41.

Figure 2:
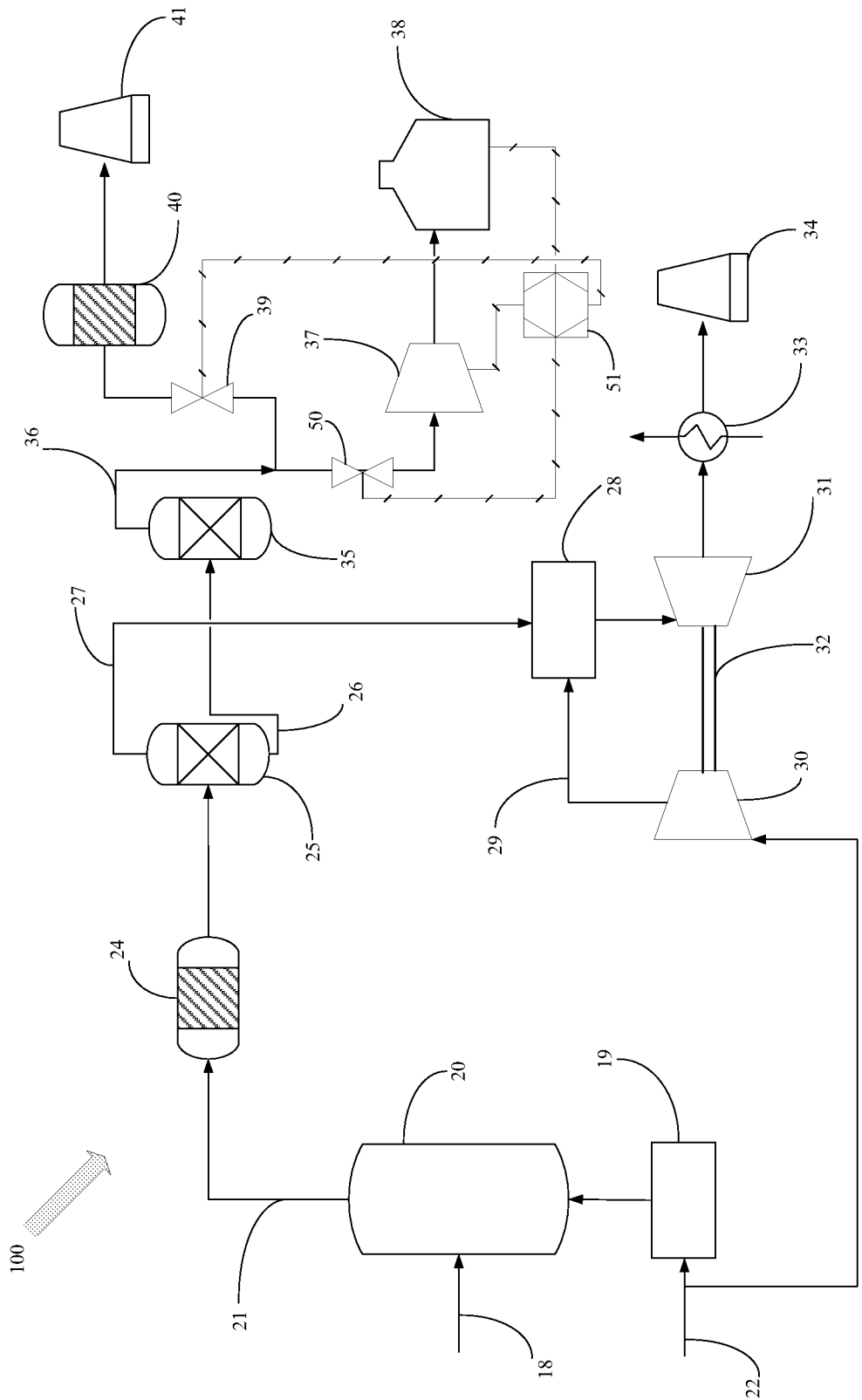
FIG. 2 depicts an alternative schematic process flow for an exemplary IGCC system in accordance with embodiments of the invention.

FIG. 2 depicts a similar schematic process flow for an exemplary IGCC system 100 incorporating a selective sulfur removal unit 40, having the same components with the same numbering as in FIG. 1, but further illustrating placement of one or more system controller 51. FIG. 2 is essentially a somewhat more detailed (as well as automated) embodiment of the system of FIG. 1. Thus, system 100 further includes at least one system controller 51 coupled to receive sensor signals (depicted as angled-crossed lines) from $CO_2$ compressor 37, carbon dioxide storage 38, and possibly elsewhere in system 100. Controller 51 is configured to output an activation signal to an actuator (not specifically shown) adapted to facilitate fluid coupling of the selective sulfur removal unit 40 to $CO_2$ desorption unit 35 during a period of upset condition. This is generally accomplished by a signal sent from controller 51 to the actuator directing the opening of valve 39. Also during this period of system upset, controller 51 may output an activation signal effective to close valve 50 to isolate the AGRU from the compressor 37. At a suitable time, e.g., when a normal mode of operation has been restored, system controller 51 will output signals that actuate the closing of valve 39 and opening of valve 50.

Embodiments of the invention as described above may afford significant advantages, including allowing an IGCC plant operator to continue operating the plant during a failure of a carbon capture subsystem failure, or any other reason that leads to carbon capture system not being online. It would allow the operator to meet environmental regulations during this failure scenario. It may also advantageously be used for the production of additional product sulfur, which can be blended with SRU sulfur product. The types of selective sulfur removal described herein do not produce difficult-to-dispose solids that may associated with alkali scrubbing of a sour gas.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

As used herein, the phrases "adapted to," "configured to," and the like refer to elements that are sized, arranged or manufactured to form a specified structure or to achieve a specified result. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. It is also anticipated that advances in science and technology will make equivalents and substitutions possible that are not now contemplated by reason of the imprecision of language and these variations should also be construed where possible to be covered by the appended claims.

What is claimed as new and desired to be protected by Letters Patent of the United States is:

1. A method for treating carbon dioxide, comprising:
providing a carbon dioxide enriched stream comprising carbon dioxide and at least one oxidizable sulfur compound selected from hydrogen sulfide, carbonyl sulfide, mercaptan, dialkyl sulfide or dialkyl disulfide, wherein the carbon dioxide enriched stream comprises at least about 50 mol % $CO_2$; and
passing at least some of the carbon dioxide enriched stream to carbon dioxide storage; wherein the method further comprises passing at least some of the carbon dioxide enriched stream to selective sulfur removal during a period of system upset, and a cleaned CO2-rich stream is recovered from the selective sulfur removal, and the cleaned CO2-rich stream is subsequently vented, channeled to a turbine, recycled to a gasifier, and/or admixed with a combustible material and flared.

2. The method according to claim 1, wherein the carbon dioxide enriched stream comprises hydrogen sulfide in an amount of from about 0.1 mol % $H_2S$ to about 2 mol % $H_2S$.

3. The method according to claim 1, wherein carbon dioxide storage comprises a carbon dioxide sink selected from one or more of: carbon dioxide pipeline, enhanced oil recovery system employing carbon dioxide, $CO_2$ storage tank, saline aquifer $CO_2$ storage, undersea $CO_2$ storage, subsea $CO_2$ storage, well, mine, and cave; and
wherein system upset comprises condition where the carbon dioxide sink has insufficient capacity to accept $CO_2$.

4. The method according to claim 1, further comprising passing the carbon dioxide enriched stream to a compression system prior to passing at least some of the carbon dioxide enriched stream to carbon dioxide storage, and
wherein system upset comprises condition where the compression system has insufficient capacity to compress the carbon dioxide enriched stream.

5. The method according to claim 1, wherein system upset comprises condition selected from one or more of: insufficiency of an acid gas removal unit, plant startup, and plant shutdown.

6. The method according to claim 1, wherein selective sulfur removal comprises one or more selected from selective physical sulfur removal and selective chemical sulfur removal.

7. The method according to claim 1, wherein selective sulfur removal comprises oxidation of the at least one oxidizable sulfur compound by an oxidative liquid or an oxidative solid.

8. The method according to claim 7, wherein selective sulfur removal comprises oxidation of the at least one oxidizable sulfur compound by an oxidative liquid, wherein the oxidative liquid comprises an aqueous solution of a compound of one or more metal selected from iron, copper, manganese, vanadium, and cobalt.

9. The method according to claim 1, wherein the carbon dioxide enriched stream is derived from a syngas.

10. The method according to claim 9, further comprising gasifying a carbonaceous feedstock in a gasifier to form the syngas.

* * * * *